United States Patent
Chien

(10) Patent No.: US 6,501,945 B1
(45) Date of Patent: Dec. 31, 2002

(54) CELLULAR PHONE WITH AN INSULATING ENVELOPE FOR PREVENTING LEAKAGE OF ELECTROMAGNETIC RADIATION

(75) Inventor: Yu-Kun Chien, I Lan Hsien (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 09/479,672

(22) Filed: Jan. 10, 2000

(30) Foreign Application Priority Data

Feb. 5, 1999 (TW) .................................. 88101756 A

(51) Int. Cl.[7] .............................. H05K 7/14; H04B 1/10
(52) U.S. Cl. ........................ 455/296; 455/90; 455/300; 455/301; 361/818; 361/816; 361/800
(58) Field of Search ................................ 455/300, 301, 455/550, 90, 575, 296; 361/799, 800, 816, 818

(56) References Cited

U.S. PATENT DOCUMENTS

| | | | |
|---|---|---|---|
| 5,235,636 A | * 8/1993 | Takagi et al. | 379/368 |
| 5,271,056 A | * 12/1993 | Pesola et al. | 455/550 |
| 5,990,989 A | * 11/1999 | Ozawa | 349/61 |
| 6,110,563 A | * 8/2000 | Pienimaa et al. | 428/137 |
| 6,120,935 A | * 9/2000 | Van Lerberghe | 429/211 |

* cited by examiner

Primary Examiner—Edward F. Urban
Assistant Examiner—S. Smith
(74) Attorney, Agent, or Firm—Winston Hsu

(57) ABSTRACT

The present invention provides a cellular phone comprising: a housing having front and rear casings wherein the rear casing comprises a metallic layer coated on an inner side of the rear casing for insulating electromagnetic radiation, a circuit board installed in the housing having a board surface and an antenna connector installed at an upper end of the board surface, an antenna installed at an upper end of the housing and electrically connected with the antenna connector at the upper end of the board surface for receiving or emitting electromagnetic radiation, and an elastic conductor. When the front and rear casings are connected, the elastic conductor is elastically clamped between the board surface of the circuit board and the metallic layer on the inner side of the rear casing so that the metallic layer on the inner side of the rear casing, the upper end of the board surface and the elastic conductor will form an insulating envelope for preventing electromagnetic radiation emitted from the antenna connector from interfering with circuits of the cellular phone which are positioned inside the housing of the cellular phone and outside the insulating envelope.

13 Claims, 5 Drawing Sheets

CELLULAR PHONE WITH AN INSULATING ENVELOPE FOR PREVENTING LEAKAGE OF ELECTROMAGNETIC RADIATION

BACKGROUND OF THE INVENTION

1. Field of the Invention

The present invention relates to a cellular phone, and more particularly, to a cellular phone with an insulating envelope for preventing leakage of electromagnetic radiation.

2. Description of the Prior Art

A cellular phone comprises a housing, a circuit board installed inside the housing, and an antenna installed at a top end of the housing. The many different functional units on the circuit board can be roughly classified into three parts based on their functions. These three parts are: a first RF circuit, a second RF circuit, and a base band circuit. The main components of the first RF circuit include an antenna connector, a duplexer, and a power amplifier. The second RF circuit comprises an RF transmitter circuit and an RF receiver circuit. When the cellular phone is transmitting RF signals, the power of the transmitted RF signals is strong and may influence, or even interfere with, other functional units. This noise interferes with many functional units such as the RF receiver circuit, the RF transmitter circuit, and the baseband circuit. Interference with the RF receiver circuit causes reduced sensitivity to received signals, which is undesirable for a cellular phone. A device is necessary to properly insulate the functional units from such radiation interference so that the sensitivity of the cellular phone to incoming signals can be improved and the cellular phone can operate normally.

Shielding the functional units of the cellular phone from radiation interference and improving the sensitivity of the cellular phone is often accomplished by electrically grounded metallic shields installed on the circuit board of the cellular phone. Also, a thin metallic layer is often coated on the inner side of the housing for preventing electromagnetic radiation in the interior of the cellular phone from leaking out. This reduces radiation leakage and prevents electromagnetic interference from occurring. Thus, the metallic shields and the metallic layer on the inner side of the casing can reduce the radiation interference for the functional units, improve the sensitivity of the cellular phone to incoming signals, and reduce the radiation that escapes from the cellular phone.

Please refer to FIG. 1 to FIG. 3. FIG. 1 is a schematic diagram of a cellular phone 10 according to the prior art. FIG. 2 is a side view of the cellular phone 10 shown in FIG. 1. FIG. 3 is an exploded diagram of the cellular phone 10 shown in FIG. 1. The cellular phone comprises a front casing 12, a rear casing 14, a circuit board 20 installed between the front casing 12 and the rear casing 14, an antenna 16 installed at the top end of the rear casing 14, and a battery 18. The rear casing 14 and the circuit board 20 individually comprise four screw holes 15 (shown in FIG. 4) for fixing the rear casing 14 via the circuit board 20 to the front lid 12.

Please refer to FIG. 4. FIG. 4 is a schematic diagram of the circuit board 20 as seen from the direction labeled as "A" in FIG. 3. The functional units of the circuit board 20 include an antenna connector 22 electrically connected to the lower end of the antenna 16, a duplexer 24 for separating the emitted RF signals and received RF signals, a power amplifier 26 used for amplifying the power of the emitted signals, an RF receiver circuit 28 for receiving RF signals and converting them into baseband signals, an RF transmitter circuit 30 for processing the baseband signals from the baseband circuit 32 and converting them into RF signals, and a baseband circuit 32. As shown in FIG. 4, the power amplifier 26 with the duplexer 24, the RF receiver circuit 28, the RF transmitter circuit 30, and the baseband circuit 32 on the circuit board are respectively covered by grounded metallic shields 34, 36, 35, 37 to prevent electromagnetic interference.

The power of the transmitted RF signals is strong, so RF noise may be emitted from the power amplifier 26, the duplexer 24, and the antenna connector 22. Since the RF noise comes from more than one source, it is preferred in the conventional art to shield each possible noise source to ensure that each functional unit functions well. The metallic shields 34, 35, 36, 37 diminish radiation interference for these functional units and maintain the sensitivity of the cellular phone 10 to incoming signals. However, these metallic shields 34, 35, 36, 37 increase the cost and the weight of the cellular phone 10.

To reduce the radiation that leaks outside of the cellular phone, and to minimize interference caused by external radiation entering the cellular phone, the inner sides of the front casing 12 and the rear casing 14 of the cellular phone 10 are coated with a thin metallic layer of low impedance. When the rear casing 14 is screwed to the front casing 12, the metallic layer on the inner side of the rear casing 14 electrically connects with the electric ground layer of the circuit board 20. This improves grounding and prevents RF signals in the interior of the cellular phone from leaking out of the cellular phone, and also prevents radiation from outside of the cellular phone from interfering with the interior circuits of the cellular phone.

RF signals in close proximity to the antenna connector 22 are strong and an induced current is therefore easily generated in the metallic layer on the inner side of the rear casing 14 by the RF signals in the interior of the cellular phone. Because the coated metallic layer on the inner side of the rear casing 14 is grounded only via screws, the grounded area is not very large. Therefore, the grounding is poor and any induced current will emit more radiation that further interferes with each of the functional units within the cellular phone.

If many metallic shields are used, the cost and weight of the cellular phone is increased. In any case, the prior art grounding of the metallic layers with the inner sides of the casings 12, 14 is unsatisfactory because the metallic layers are electrically connected to the ground layer of the circuit board 20 by a limited numbers of screws. The question of how to reduce the quantity of metallic shields while improving the grounding of the metallic layer on the inner side of the casing and maintaining optimal performance of each of the functional units of the cellular phone is very important for cellular phone design.

SUMMARY OF THE INVENTION

It is therefore a primary objective of the present invention to provide a cellular phone with an insulating envelope for preventing leakage of electromagnetic radiation to solve the above mentioned problem.

In a preferred embodiment, the present invention provides a cellular phone comprising:

a housing having front and rear casings wherein the rear casing comprises a metallic layer coated on an inner side of the rear casing for insulating electromagnetic radiation;

a circuit board installed in the housing having a board surface and an antenna connector installed at an upper end of the board surface;

an antenna installed at an upper end of the housing and electrically connected with the antenna connector at the upper end of the board surface for receiving or emitting electromagnetic radiation; and an elastic conductor;

wherein when the front and rear casings are connected, the elastic conductor can be elastically clamped between the board surface of the circuit board and the metallic layer on the inner side of the rear casing so that the metallic layer on the inner side of the rear casing, the upper end of the board surface and the elastic conductor will form an insulating envelope for preventing the electromagnetic radiation emitted from the antenna connector from interfering with other circuits of the cellular phone which are positioned inside the housing of the cellular phone and outside the insulating envelope.

It is an advantage of the present invention that not only is the quantity of metallic shields on the circuit board reduced but also radiation interference between the functional units is reduced.

These and other objectives of the present invention will no doubt become obvious to those of ordinary skill in the art after having read the following detailed description of the preferred embodiment, which is illustrated in the various figures and drawings.

DETAILED DESCRIPTION OF THE PREFERRED EMBODIMENT

Figure 1:
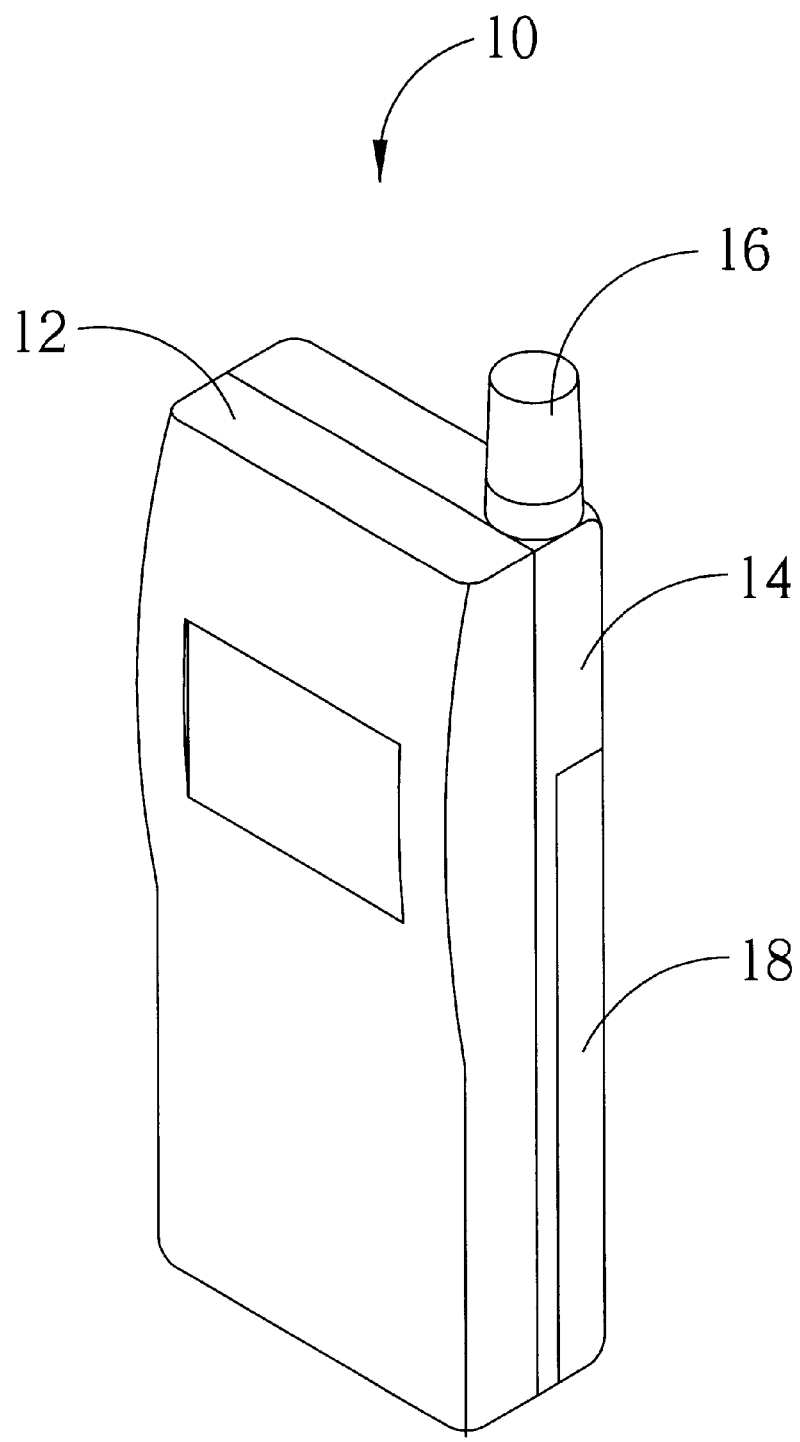
FIG. 1 is a schematic diagram of a cellular phone according to the prior art.
Figure 3:
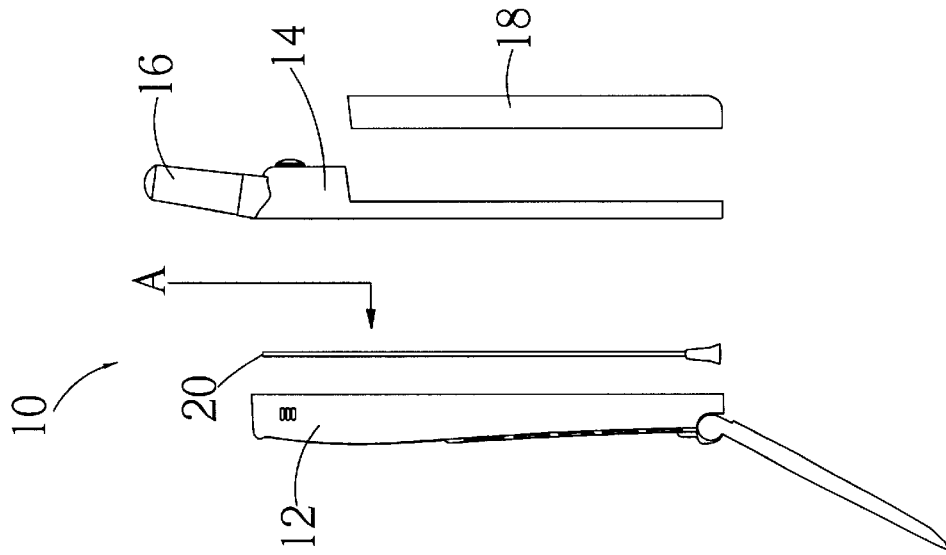
FIG. 3 is an exploded diagram of the cellular phone shown in FIG. 1.
Figure 2:
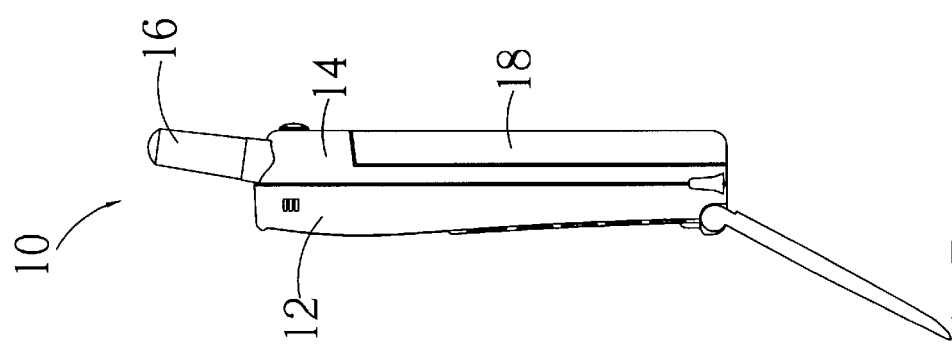
FIG. 2 is a side view of the cellular phone shown in FIG. 1.
Figure 4:
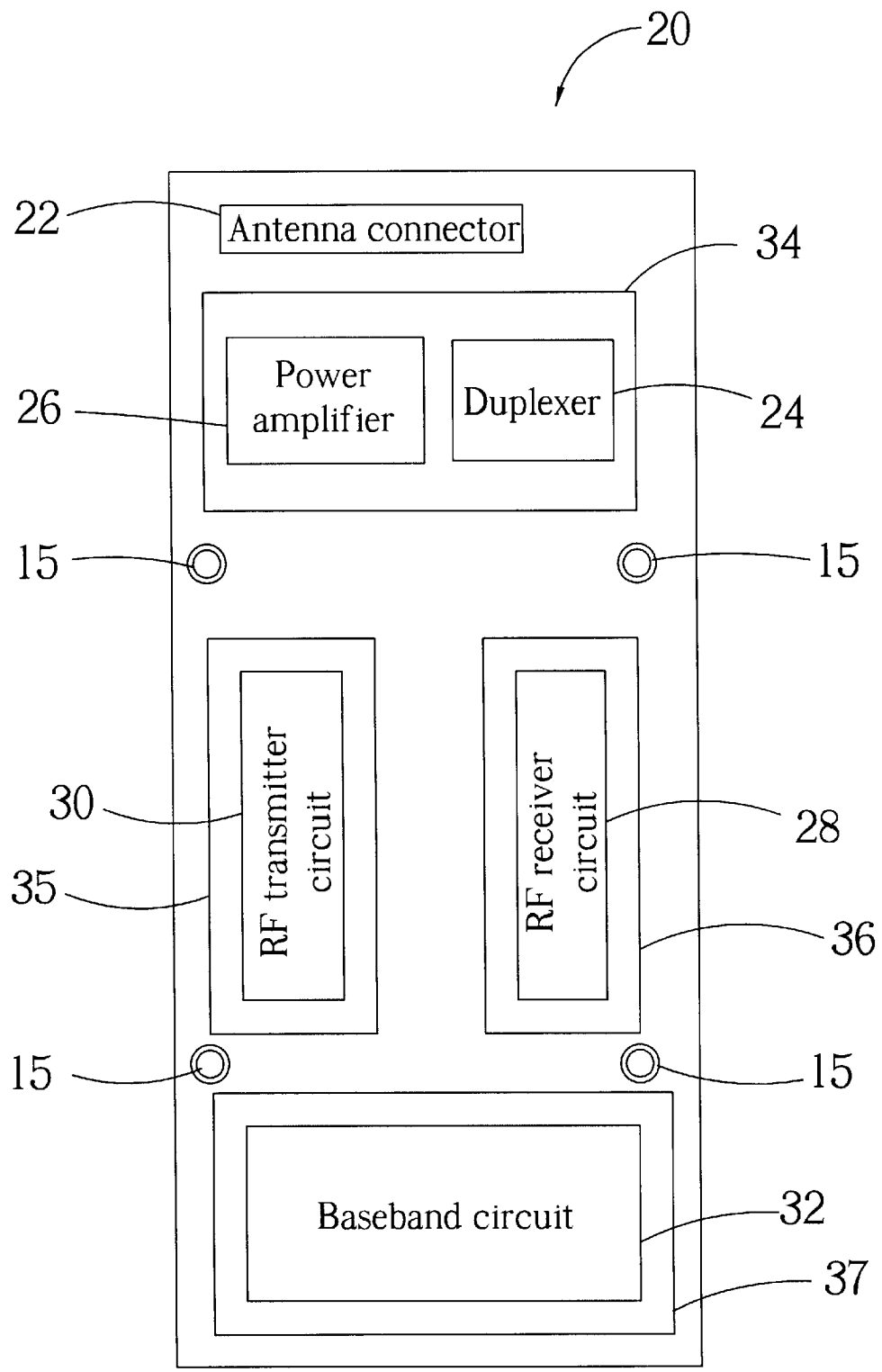
FIG. 4 is a schematic diagram of the circuit board along direction "A" shown in FIG. 3.
Figure 5:
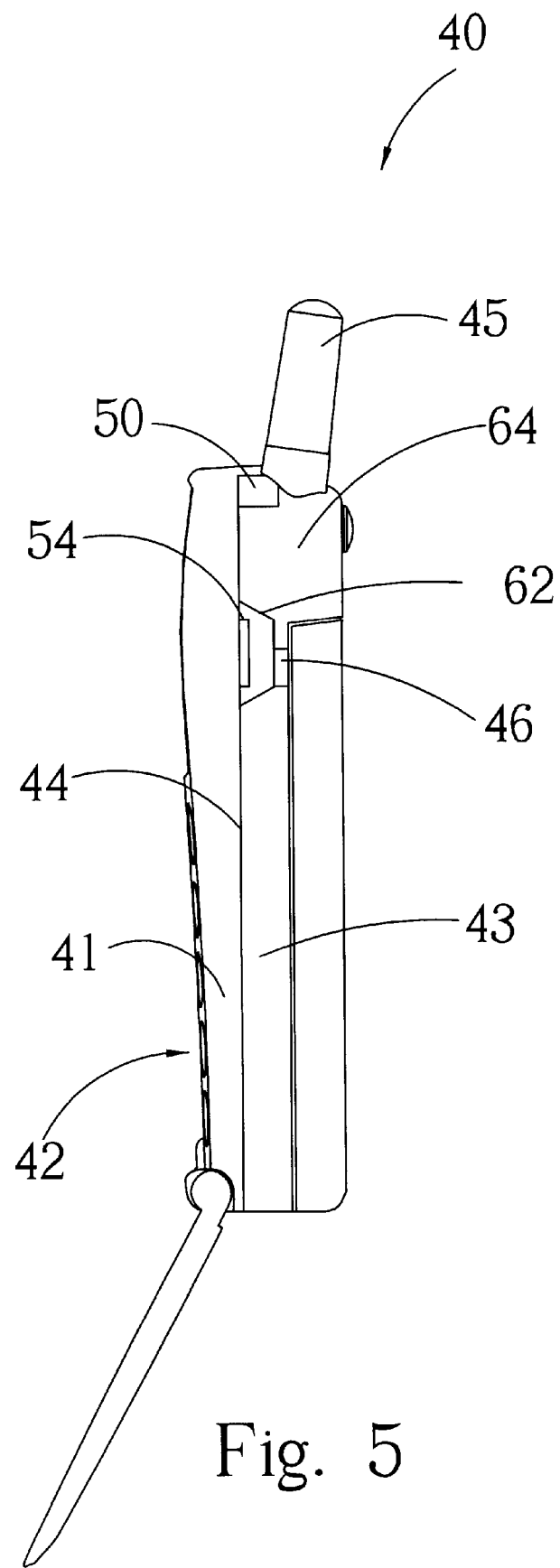
FIG. 5 is a schematic diagram of the cellular phone according to the present invention.
Figure 6:
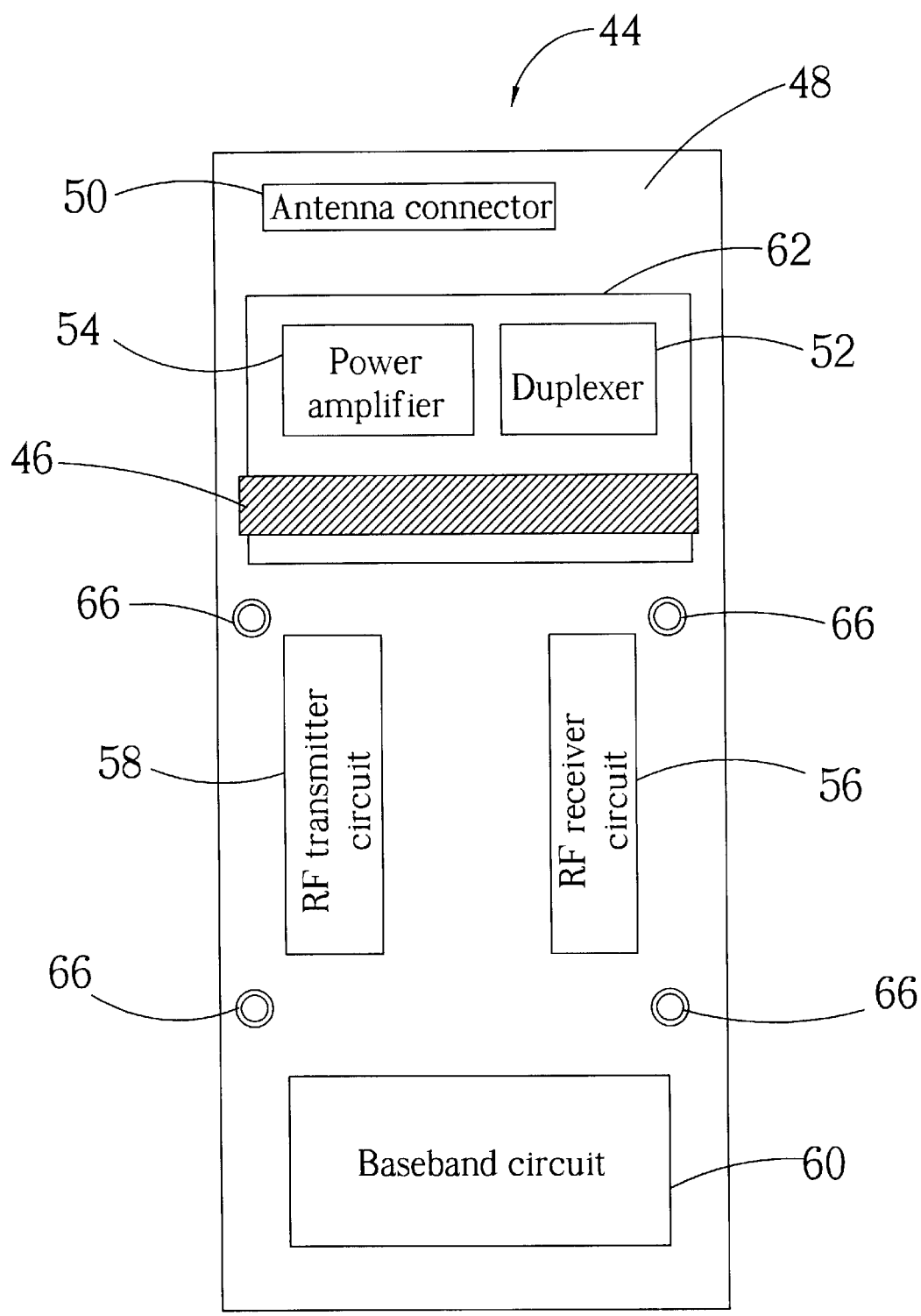
FIG. 6 is a schematic diagram of the circuit board of the cellular phone shown in FIG. 5.

Please refer to FIG. 5 and FIG. 6. FIG. 5 is a schematic diagram of a cellular phone 40 according to the present invention. FIG. 6 is a schematic diagram of a circuit board 44 of the cellular phone 40 shown in FIG. 5. A cellular phone 40 of the present invention comprises a housing 42, a circuit board 44 installed in the housing 42, an antenna 45 installed at an upper end of the housing 42, an elastic strip-shaped conductor 46, and a protruding metallic shield 62. The housing 42 comprises a front casing 41 and a rear casing 43 that can be engaged together. The rear casing 43 comprises a metallic layer coated on an inner side for insulating electromagnetic radiation. The circuit board 44 has a board surface 48 and an antenna connector 50 installed at an upper end of the board surface 48, a power amplifier 54 installed on the board surface 48 below the antenna connector 50, a duplexer 52, an RF receiver circuit 56, an RF transmitter circuit 58, and a baseband circuit 60. The antenna 45 is installed at an upper end of the housing and is electrically connected to the antenna connector 50 at the upper end of the board surface 48. The antenna 45 is used to receive or emit electromagnetic radiation. The strip-shaped conductor 46 is fixed to the inner side of the rear casing 43 and elastically contacts the metallic layer of the rear casing 43. The metallic shield 62 is positioned on the power amplifier 54 for shielding electromagnetic radiation emitted from the power amplifier 54.

When the front and rear casings 41, 43 are connected, the strip-shaped conductor 46 on the inner side of the rear casing 43 elastically contacts the metallic shield 62 on the board surface 48 of the circuit board. Then, the metallic layer on the inner side of the rear casing 43, the strip-shaped conductor 46, the metallic shield 62, and the upper end of the board surface 48 of the circuit board 44 form an insulating envelope 64. The insulating envelope 64 prevents electromagnetic radiation emitted from the antenna connector 50 from interfering with other circuits located inside the housing 42 of the cellular phone 40 and outside the insulating envelope 64.

The rear casing 43 and the circuit board 44 further comprises four screw holes 66. The rear casing 43 can be screwed to the front casing 41 via the circuit board 44. The strip-shaped conductor 46 is elastic so when the rear casing 43 is screwed to the front casing 41 by four screws, the strip-shaped conductor 46 is clamped between the metallic layer on the inner side of the rear casing 43 and the metallic shield 62 and is electrically connected with the metallic shield 62. Also, the circuit board 44 further comprises an electric ground (not shown) and the metallic shield 62 is electrically connected to the electric ground of the circuit board 44. When the rear casing 43 is screwed to the front casing 41, the metallic layer on the inner side of the rear casing 43 is grounded via the strip-shaped conductor 46 and the metallic shield 62. Therefore, the metallic layer on the inner side of the rear casing 43 is grounded by both the screws and the strip-shaped conductor 46.

In the cellular phone 40 of the present invention, a well-grounded metallic shield 62 is installed on the major radiation sources, such as the duplexer 52 and the power amplifier 54. The metallic shield 62, the strip-shaped conductor 46, the metallic layer on the inner side of the rear casing 43, and the top end of the board surface of the circuit board form an insulating envelope 64 that prevents leakage of electromagnetic radiation. Other significant sources of radiation interference, such as the bottom end of the antenna 45 and the antenna connector 50, are also positioned inside the envelope 64. The metallic shield 62 is grounded via the electric ground of the circuit board 44. The strip-shaped conductor 46 is grounded via the metallic shield 62. The metallic layer on the inner side of the rear casing 43 is grounded via the strip-shaped conductor 46 and the metallic shield 62. This scheme allows grounding of the envelope 64 of the present invention to be much better than the conventional art and thus can effectively prevent RF radiation from entering or leaving the envelope 64. When the cellular phone 40 emits signals, a lot of electromagnetic radiation is emitted from the antenna connector 50. The strip-shaped conductor 46 provides the metallic shield 62 and the metallic layer on the inner side of the rear casing 43 with a bridge for electrical connection so that the metallic layer on the inner side of the rear casing 43 is electrically connected to the electric ground of the circuit board 44. This improves the grounding of the metallic layer on the inner side of the rear casing 43, and thus reduces the induced current generated by the electromagnetic radiation from the antenna connector 50.

Of the main radiation interfering sources of the cellular phone 40, the duplexer 52 and the power amplifier 54 are shielded by the metallic shield 62, and electromagnetic radiation emitted from the antenna connector 50 is confined within the envelope 64. The main sources of interfering radiation are shielded to avoid interference with other circuits. At the same time, no extra metallic shields are needed in either the RF transmitter circuit 58, the RF receiver circuit 56 or the baseband circuit 60. As a result, the weight, thickness, and cost of the cellular phone 40 are all reduced without compromising performance.

The strip-shaped conductor 46 can be made by wrapping a flexible metallic cloth around a strip-shaped piece of rubber and can be fixed to the inner side of the rear casing 43 or installed on the metallic shield 62 on the circuit board 44. Only when the front casing 41 and the rear casing 43 are engaged is the strip-shaped conductor 46 elastically wedged between the metallic layer on the inner side of the rear casing 43 and the metallic shield 62. In this way, the metallic shield 62, the strip-shaped conductor 46, the metallic layer on the inner side of the rear casing 43, and the top end of the board surface of the circuit board form an envelope 64. The envelope 64 need not be perfectly leak-proof. So long as the envelope 64 is sufficiently closed to prevent electromagnetic radiation from entering or leaving the envelope 64, it will suffice.

There are two conductors in this embodiment. The first conductor is the strip-shaped conductor 46 fixed to the inner side of the rear casing 43. The second conductor is the metallic shield 62 casing positioned over the duplexer 52 and the power amplifier 54. In addition to the above embodiment, the strip-shaped conductor 46 and the metallic shield 62 can be made as an integrated elastic conductor. In such an embodiment, when the front casing 41 and the rear casing 43 are engaged, this conductor will be elastically wedged between the metallic layer on the inner side of the rear casing 43 and the board surface 48. This conductor, together with the metallic layer on the inner side of the rear casing 43, and the top end of the board surface 48, will form an insulating envelope that confines the electromagnetic radiation emitted from the antenna connector and prevents this electromagnetic radiation from interfering with other circuits of the cellular phone external to the envelope.

Compared to the cellular phone 10 of the prior art, the cellular phone 40 of the present invention uses the metallic layer on the inner side of the rear casing 43, the strip-shaped conductor 46, and the metallic shield on the power amplifier 54 to form an envelope 64 so that electromagnetic radiation emitted from the antenna connector 50 positioned inside the envelope is confined within the envelope 64, thus protecting other circuits outside the envelope from electromagnetic interference. Also, the strip-shaped conductor 46 of the present invention improves grounding of the metallic layer on the inner side of the rear casing 43, so that induced current generated by electromagnetic radiation leaking from areas proximate to the antenna connector 50 is eliminated.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A cellular phone comprising:
    a housing having front and rear casings, the rear casing comprising a metallic layer coated on an inner side of the rear casing for insulating electromagnetic waves;
    a circuit board installed in the housing having a board surface and an antenna connector installed at an upper end of the board surface;
    an antenna installed at an upper end of the housing and electrically connected with the antenna connector at the upper end of the board surface for receiving or emitting electromagnetic radiation; and
    an elastic conductor electrically connected with the metallic layer;
    wherein when the front and rear casings are connected, the elastic conductor is elastically clamped between the board surface of the circuit board and the metallic layer on the inner side of the rear casing so that the metallic layer on the inner side of the rear casing, the upper end of the board surface and the elastic conductor form an insulating envelope for preventing electromagnetic radiation emitted from the antenna connector from interfering with circuits of the cellular phone that are positioned inside the housing of the cellular phone and outside the insulating envelope.

2. The cellular phone of claim 1 wherein the elastic conductor is fixed to the inner side of the rear casing.

3. The cellular phone of claim 2 further comprising a protruded conductor installed on the board surface wherein when the front and rear casings are connected, the elastic conductor fixed on the inner side of the rear casing will electrically and physically connect to the protruded conductor on the board surface so that the metallic layer on the inner side of the rear casing, the elastic conductor, the protruded conductor, and the upper end of the board surface will form the insulating envelope.

4. The cellular phone of claim 3 further comprising a power amplifier installed on the board surface wherein the protruded conductor is a metallic shield positioned on the power amplifier for shielding electromagnetic radiation emitted from the power amplifier.

5. The cellular phone of claim 1 wherein the antenna comprises a lower end installed in the housing and positioned in the insulating envelope wherein the insulating envelope prevents leakage of the electromagnetic waves emitted from the antenna connector and the lower end of the antenna.

6. The cellular phone of claim 1 wherein the circuit board is fixed to an inner side of the front casing wherein when the front and rear casings are connected, the elastic conductor is elastically clamped between the metallic layer on the inner side of the rear casing and the board surface of the circuit board in the front casing.

7. The cellular phone of claim 1 wherein the elastic conductor is a strip shaped conductor for elastically contacting the metallic layer of the rear casing and the board surface to form the insulating envelope.

8. The cellular phone of claim 7 wherein the strip shaped conductor is made by wrapping a flexible metallic cloth around a strip-shaped piece of rubber.

9. The cellular phone of claim 1 wherein the circuit board further comprises an electric ground, and the metallic layer of the rear casing is electrically connected to the electric ground of the circuit board for grounding the insulating envelope.

10. A portable communication device comprising:
    a housing having front and rear casings, the rear casing comprising a layer coated on an inner side of the rear casing for insulating electromagnetic radiation;
    a circuit board installed in the housing having a power amplifier;
    a shield positioned on the power amplifier for shielding electromagnetic radiation emitted from the power amplifier; and an elastic conductor located on the shield, the elastic conductor being made by wrapping a flexible metallic cloth around a piece of rubber;

wherein when the front and rear casings are connected, the elastic conductor is elastically clamped between the shield and the layer on the inner side of the rear casing so that the layer on the inner side of the rear casing, the shield, the upper end of the board surface and the elastic conductor form an insulating envelope for preventing electromagnetic radiation interfering with circuits of the portable communication device that are positioned inside the housing of the cellular phone and outside the insulating envelope.

11. The portable communication device of claim 10, the circuit board further comprising an electric ground, the electric ground of the circuit board electrically connected to the layer of the rear casing for grounding the insulating envelope.

12. A portable communication device comprising:

a housing having a layer coated on an inner side of the housing for insulating electromagnetic radiation;

a circuit board installed in the housing having a power amplifier;

a shield positioned on the power amplifier for shielding electromagnetic radiation emitted from the power amplifier; and an elastic conductor located on the shield, the elastic conductor being made by wrapping a flexible metallic cloth around a piece of rubber;

wherein the elastic conductor is elastically clamped between the shield and the layer on the inner side of the housing so that the layer on the inner side of the housing, the shield, the upper end of the board surface and the elastic conductor form an insulating envelope for preventing electromagnetic radiation interfering with circuits of the portable communication device that are positioned inside the housing of the cellular phone and outside the insulating envelope.

13. The portable communication device of claim 12 wherein the circuit board further comprises an electric ground and the layer of the housing is electrically connected to the electric ground of the circuit board for grounding the insulating envelope.

* * * * *